(12) United States Patent  (10) Patent No.: US 12,342,947 B2
Grayson et al.  (45) Date of Patent: Jul. 1, 2025

(54) CHILD WALKING ASSEMBLY AND RELATED METHOD

(71) Applicant: Toddle Buddy, Inc., Woodland Hills, CA (US)

(72) Inventors: Lisa Grayson, Woodland Hills, CA (US); Richard Grayson, Woodland Hills, CA (US)

( * ) Notice: Subject to any disclaimer, the term of this patent is extended or adjusted under 35 U.S.C. 154(b) by 124 days.

(21) Appl. No.: 18/229,598

(22) Filed: Aug. 2, 2023

(65) Prior Publication Data

US 2024/0041226 A1  Feb. 8, 2024

Related U.S. Application Data

(60) Provisional application No. 63/395,254, filed on Aug. 4, 2022.

(51) Int. Cl.
*A47D 13/04* (2006.01)
*B62B 9/20* (2006.01)

(52) U.S. Cl.
CPC ............... *A47D 13/04* (2013.01); *B62B 9/20* (2013.01)

(58) Field of Classification Search
CPC .. A47D 13/04; B62B 9/20; B62B 5/06; B62B 5/064; B62B 5/065; B62B 5/067
See application file for complete search history.

(56) References Cited

U.S. PATENT DOCUMENTS

| 1,332,461 | A | 3/1920 | Bowden |
| 3,529,819 | A | 9/1970 | Blank |
| 5,044,650 | A | 9/1991 | Eberle, Jr. |
| 5,788,253 | A | 8/1998 | Thomson et al. |
| 6,086,087 | A | 7/2000 | Yang |
| 6,098,492 | A * | 8/2000 | Juchniewicz ............ B62B 9/20 |
| | | | 74/555 |
| 6,231,056 | B1 | 5/2001 | Wu |
| 6,267,404 | B1 | 7/2001 | Yang et al. |
| 6,447,001 | B1 | 9/2002 | Hsia |
| 7,828,305 | B2 * | 11/2010 | Meyers ..................... A61H 3/04 |
| | | | 280/87.021 |
| 8,029,007 | B2 * | 10/2011 | Jones ..................... B62D 63/00 |
| | | | 280/47.131 |
| 8,079,379 | B2 | 12/2011 | Peron |
| 8,439,055 | B2 | 5/2013 | April et al. |
| 8,464,397 | B2 | 6/2013 | Arnold, IV et al. |
| 8,622,357 | B2 | 1/2014 | Youngblood |
| 8,714,570 | B2 * | 5/2014 | Skijus ..................... B62B 5/067 |
| | | | 16/422 |
| 9,266,550 | B1 * | 2/2016 | Shah ......................... B62B 9/20 |
| 10,383,456 | B1 | 8/2019 | Gyasi |
| 10,499,749 | B2 | 12/2019 | Burns |
| 2003/0229966 | A1 | 12/2003 | Boice |
| 2006/0113737 | A1 | 1/2006 | Austin et al. |
| 2007/0210560 | A1 * | 9/2007 | Groover ................... B62B 9/24 |
| | | | 280/642 |

(Continued)

*Primary Examiner* — John D Walters

(74) *Attorney, Agent, or Firm* — Aaron T. Borrowman; YK Law LLP

(57) ABSTRACT

A child walker assembly is detachably connected to a stroller so as to extend away therefrom and enable the child to grasp and use a handle of the assembly for balance and support while walking as the parent pushes the stroller. The assembly is adjustable in width and/or length. The handle may be raised or lowered to be positioned at an appropriate height for the child.

25 Claims, 16 Drawing Sheets

(56) References Cited

U.S. PATENT DOCUMENTS

| | | |
|---|---|---|
| 2016/0107672 A1 | 4/2016 | Smith |
| 2016/0257331 A1* | 9/2016 | Nuske ..................... B62B 9/26 |
| 2016/0302588 A1 | 10/2016 | Douglass et al. |
| 2021/0347397 A1 | 11/2021 | De Stoop |

* cited by examiner

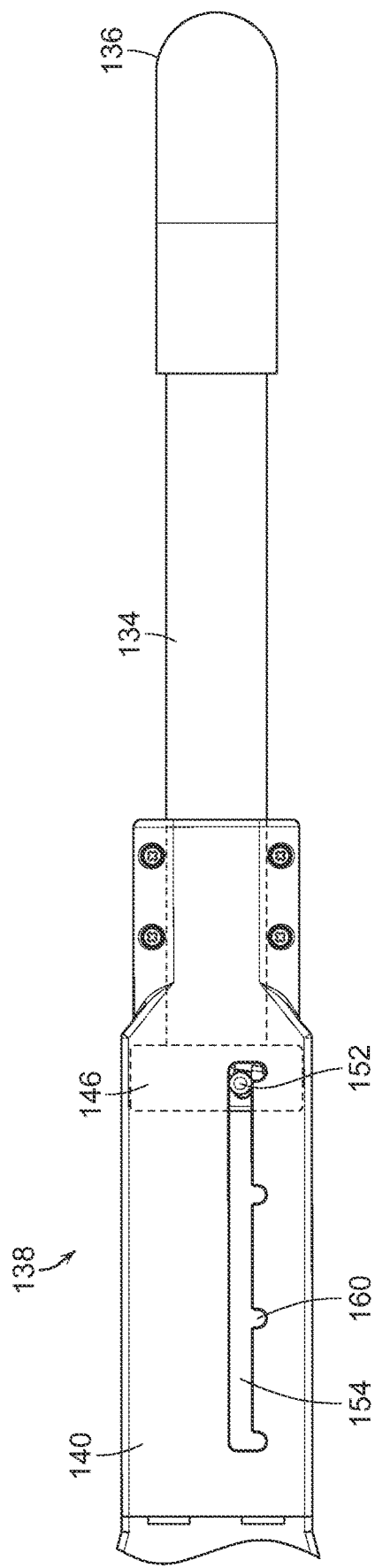
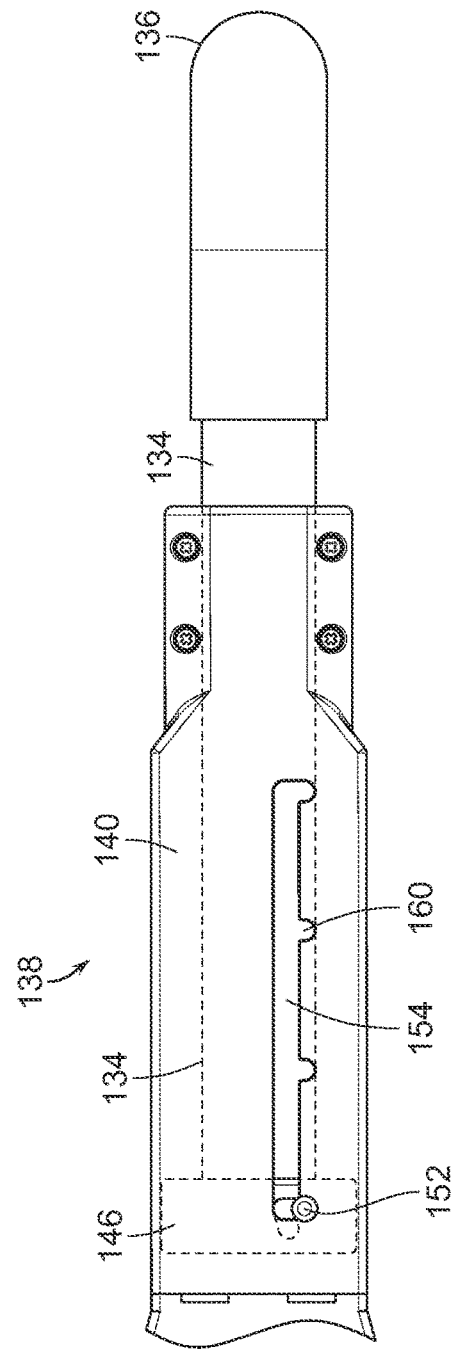
FIG. 7
FIG. 8

CHILD WALKING ASSEMBLY AND RELATED METHOD

RELATED APPLICATIONS

This application claims the benefit of U.S. Provisional Application No. 63/395,254, filed on Aug. 4, 2022.

BACKGROUND OF THE INVENTION

The present invention generally relates to child walker training and assisting devices. More particularly, the present invention relates to a child walking assembly detachably connected to a stroller which assists a child in walking.

When transporting an infant or toddler who is unable to walk, a parent or caregiver typically uses one of three methods of transporting the child. The parent or caregiver may hold and carry the infant or toddler in his or her arms while walking from one location to another. In some cases, the parent or caregiver may have an infant carrier or sling or the like attached to their body for assisting in carrying the infant or toddler. In other cases, the infant or toddler may be carried by the parent or caregiver in a carrier seat which has a handle which the parent can hold to carry the child. Such a carrier may be detachably connected to a car carrier seat for transportation in a vehicle. The infant or toddler may also be placed in a stroller and wheeled from one location to another as the parent pushes the stroller.

As the child grows and gets older, however, the child first begins to crawl and then begins to slowly learn how to walk. There are many known apparatuses, typically confined to home use, which support the child in a vertical manner and enable the child to move his or her legs, and in some cases the apparatus, so as to act as a trainer or a walking assistance device. In these cases, typically, the child is supported at the torso or under the groin while the child's legs can touch the floor and, in some cases, propel the child and the supporting apparatus. Such apparatuses, however, are typically not meant for use outside of a household.

During this time of learning to walk, the child is often of a size which makes it increasingly difficult for the parent or caregiver to carry the child in a carrier. Moreover, the child oftentimes does not want to be constrained in a carrier or stroller for a long period of time. However, when the child is being transported outside, in a shopping mall or store, etc., there typically is no viable solution or alternative for the parent or caregiver to either hold or carry or push the child in the stroller. This also presents problems when the parent or caregiver has other items which the parent or caregiver must hold and carry and transport.

Accordingly, there is a continuing need for a device which can be used by a parent or caregiver to assist or even train the child to walk in a safe manner but yet which is usable outside of the household, such as when outdoors, in a store, etc. The present invention fulfills these needs and provides other related advantages.

SUMMARY OF THE INVENTION

The present invention generally relates to a child walking assembly for a stroller or other similar wheeled apparatus. The child walking assembly of the present invention can be used by a parent or caregiver to assist or even train the child to walk in a safe manner behind the stroller or the like and is usable outside of the household, such as when outdoors, in a store, etc.

In accordance with the method of the present invention, which enables the child to supportively walk behind a stroller or the like, a child walking assembly is provided comprising first and second mounting mechanisms, first and second arms extending from the first and second mounting mechanisms and a handle extending between the first and second arms. The child walking assembly is attached to a frame of the stroller by connecting the first and second mounting mechanisms to the frame of the stroller, whereby the handle is disposed a distance behind the stroller. The distance between the handle and the mounting mechanisms may be adjusted. A height of the handle may be adjusted by raising or lowering the handle relative to the mounting mechanisms. Moreover, a distance between the first and second arms may be adjusted.

A child walking assembly for a stroller generally comprises a first mounting mechanism detachably connected to a frame of the stroller. A first arm extends from the first mounting mechanism, so as to extend behind the stroller. A second mounting mechanism is detachably connected to the frame of the stroller in spaced relation to the first mounting mechanism. A second arm extends from the second mounting mechanism, so as to extend behind the stroller. The first and second arms are in spaced and generally parallel relation to one another. A handle extends between the first and second arms, whereby a child may grasp the handle and walk behind the stroller. The child walking assembly generally may have a U-shaped configuration.

The first and second mounting mechanisms are each adjustably tightened onto the frame of the stroller. The first and second mounting mechanisms each include an adjustable clamp. The adjustable clamp may comprise an adjustable jaw selectively manually movable into and out of engagement with the frame of the stroller.

The handle may be selectively raised and lowered. The first arm is pivotally attached to the first mounting mechanism and the second arm is pivotally attached to the second mounting mechanism to raise or lower the handle.

A distance between the handle and the mounting mechanism may be adjustable. A first arm extension and retraction mechanism may be associated with the first arm, and a second arm extension and retraction mechanism may be associated with a second arm for adjusting the distance between the handle and the first and second mounting mechanisms.

The handle may be adjustable to increase or decrease the distance between the first and second arms. The handle may comprise first and second tubes telescopically arranged to selectively increase or decrease the length of the handle. A locking mechanism may be used for selectively locking a length of the handle.

The first and second mounting mechanisms may be detachably connected to a remainder of the assembly. The first and second mounting mechanisms may be detachably connected to the first and second arms, or any structure between the first and second arms and the first and second mounting mechanisms, such as the first and second arm extension and retraction mechanisms and/or arm pivoting mechanisms.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 7 is a side view of an arm extension and retracting mechanism in an extended position so as to extend an arm of the assembly outward;

FIG. 8 is a side view similar to FIG. 7, but illustrating the extension and retraction mechanism in a retracted position, so as to retract the arm within a housing of the mechanism;

DETAILED DESCRIPTION OF THE PREFERRED EMBODIMENTS

Figure 1:
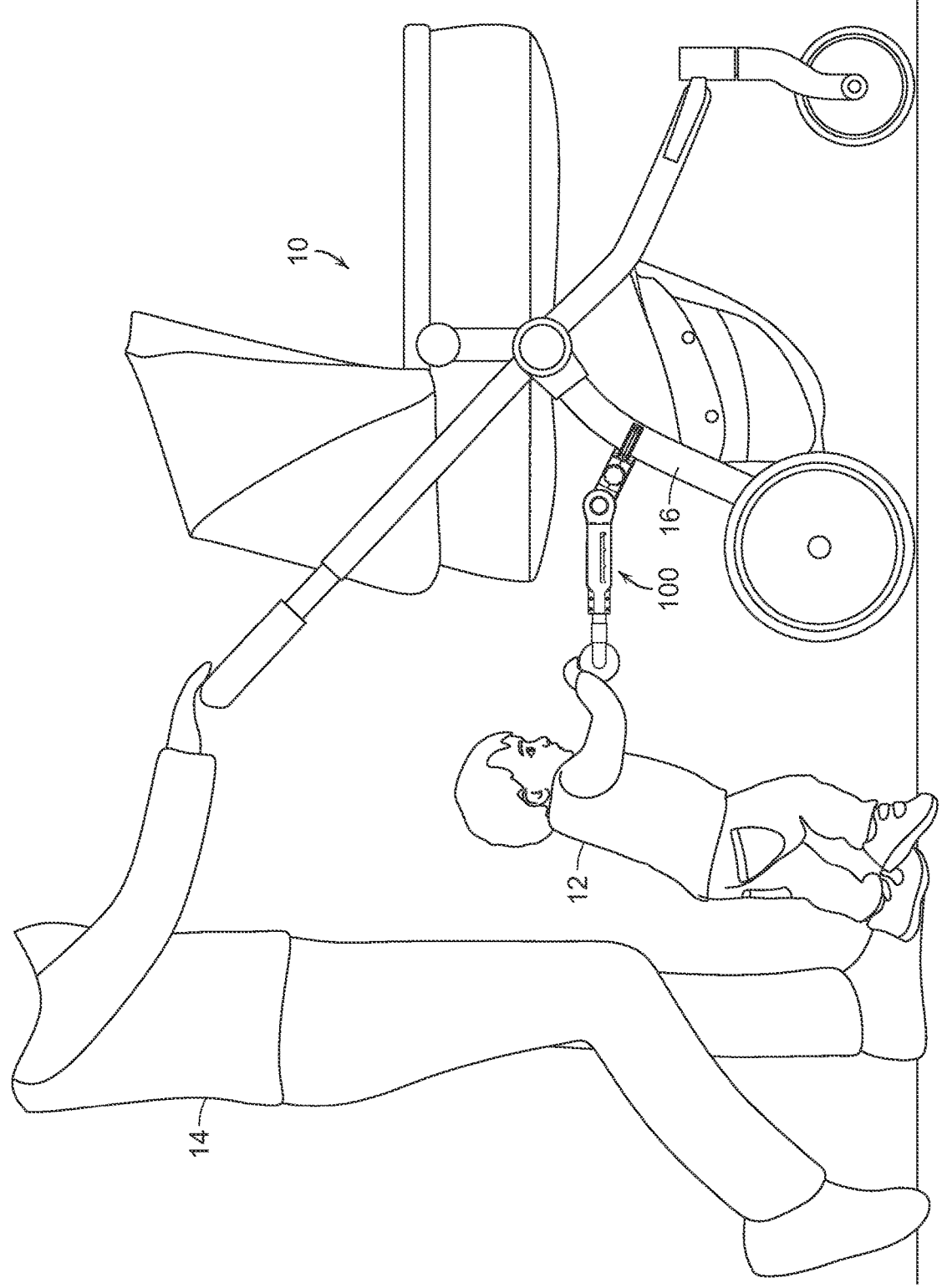
FIG. 1 is an environmental view of a child walking assembly of the present invention attached to a stroller being pushed by a parent or caregiver, and a child using the child walking assembly to walk behind the stroller, in accordance with the present invention.

As shown in the accompanying drawings, for purposes of illustration, the present invention is related to a child walker assembly, generally referred to by the reference number 100, which is attached to and extends from a stroller 10 so as to assist a child 12 in walking with the stroller as the toddler's parent or caregiver 14 pushes the stroller 10. The assembly 100 of the present invention is particularly adapted for use when a stroller would otherwise be used, such as when walking outside, in a store, etc. Instead of constraining the child to be held in the stroller or carried by the parent, the child is able to grab onto and be supported by the handheld walker assembly 100 and walk behind the stroller as the stroller is pushed by the parent or caregiver.

The assembly 100, as illustrated herein and more fully described below, is adjustable so as to be used with a wide variety of strollers having different sizes and configurations. Moreover, the adjustability of the assembly 100 of the present invention enables it to be used by children of various sizes. While the assembly 100 of the present invention is particularly suited for use with strollers, it will be understood that it could be used in connection with other wheeled devices having a frame or connecting points to which the assembly 100 can be detachably connected and extend from such wheeled device, preferably behind the wheeled device between the parent pushing the wheeled device and the wheeled device. For example, it is contemplated that the assembly 100 of the present invention could be used in connection with a shopping cart or the like. Thus, the term "stroller" as used herein encompasses not only strollers of various types, but also other wheeled device which the parent or caretaker will push and to which the assembly 100 of the present invention can be attached such that a child can grasp it and walk behind or otherwise along with the wheeled device.

Figure 2:
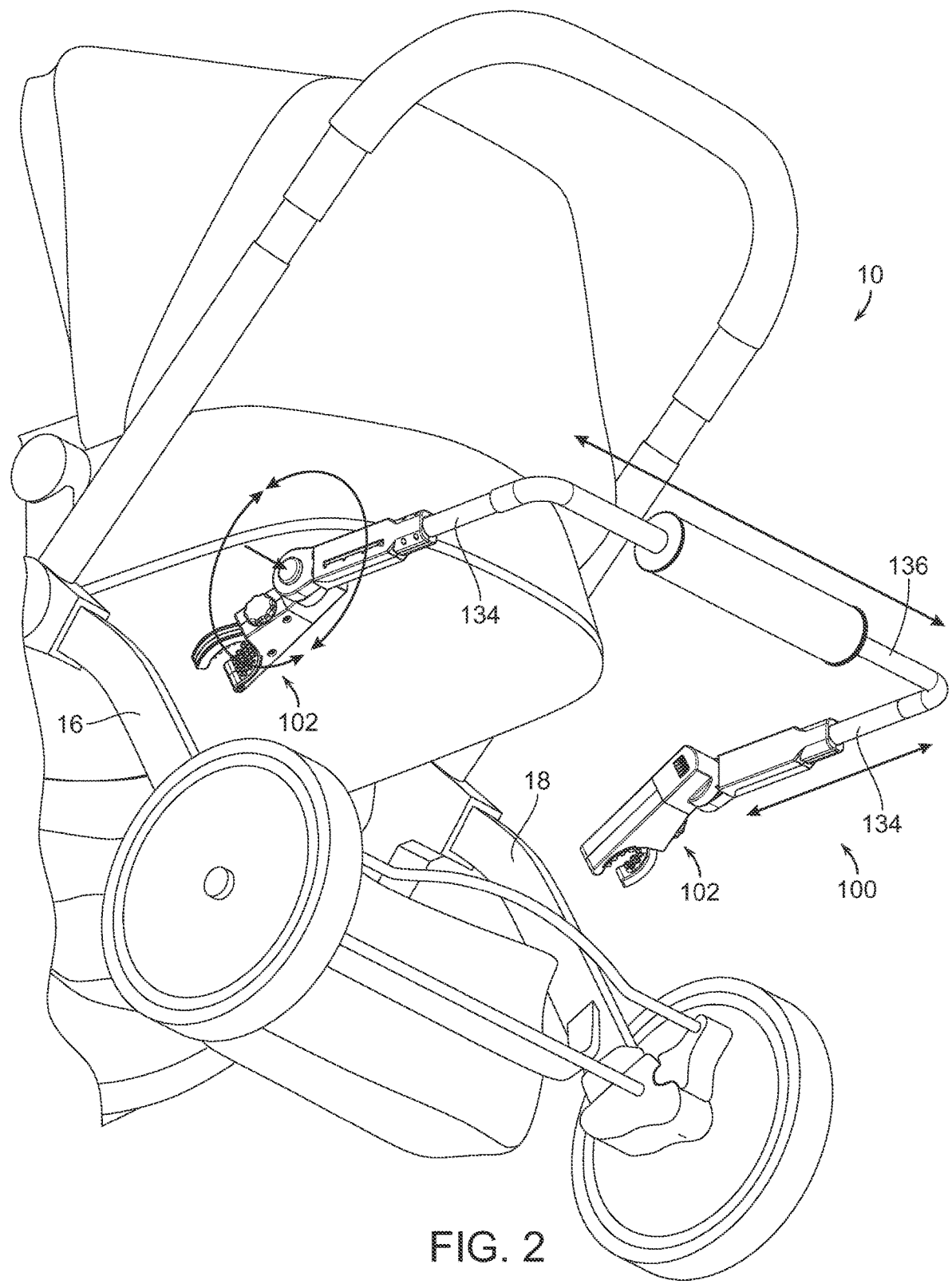
FIG. 2 is an enlarged perspective view of the child walking assembly being attached to a frame of the stroller, with directional arrows illustrating adjustability of the child walking assembly, in accordance with the present invention.

With reference now to FIGS. 1 and 2, an exemplary toddler walker assembly 100 is shown attached to a stroller 10. More particularly, in a particularly preferred embodiment, the assembly 100 is attached to a frame of the stroller 10 so as to extend behind the stroller 10. The assembly 100 is positionable at a proper height for the child 12 to grasp onto the assembly 100 for support and balance and walk along with the stroller 10 as it is pushed by the parent. With particular reference to FIG. 2, the assembly 100 of the present invention includes first and second mounting mechanisms 102 which are attachable to spaced apart members or locations of the frame 16 and 18 of the stroller 10. As shown by the directional arrows in FIG. 2, and as will be more fully explained herein, the assembly 100 of the present invention is capable of being attached to frame members of strollers of varying configurations and sizes and is extendable in length and width so as to be attachable to different types of strollers and position the child at an appropriate distance behind the stroller 10. Moreover, the assembly 100 is adjustable so as to be able to be adjustable in height to accommodate children of various heights and sizes.

Figure 3:
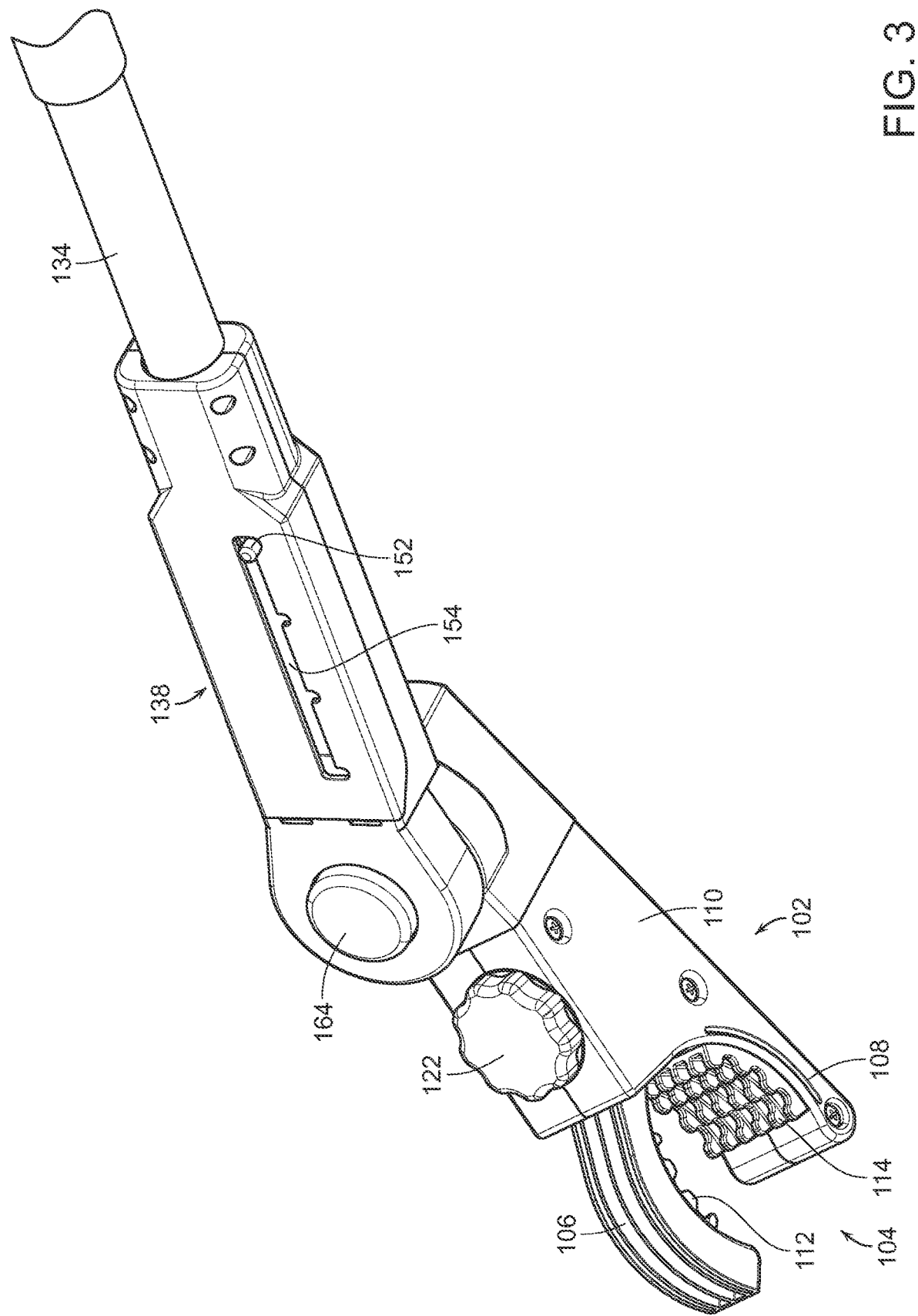
FIG. 3 is a perspective view of an end of the assembly, including a mounting mechanism used to detachably connect the child walking assembly to the frame of the stroller.

With reference now to FIG. 3, an enlarged perspective view of a free end portion of the assembly 100 of the present invention is shown, including a mounting mechanism 102. As illustrated in FIG. 2, the first and second mounting mechanisms 102 are detachably connectable to the frame 16 and 18 of the stroller 10. In the embodiment illustrated herein, each of the first and second mounting mechanisms 102 are substantially identical, but placed at the opposite ends of the assembly 100, so as to be in spaced apart relationship and attached to frame members or points on the frame of the stroller 10 which are spaced apart from one another, typically frame members or points which are towards or at the rear end of the stroller 10. The first and second mounting mechanisms 102 are each adjustably tightened onto the frame of the stroller 10.

In a particularly preferred embodiment, as illustrated, the mounting mechanism includes an adjustable clamp 104 which enables detachable connection to the frame of the stroller 10. The clamp 104 comprises an adjustable jaw 106 which is selectively manually movable into and out of engagement with the frame of the stroller 10. In the illustrated embodiment, jaw 106 is adjustably movable towards and away from a fixed jaw 108, which is an extension of a housing 110 of the mounting mechanism 102. The invention contemplates, however, that both jaws could be movable. Gripping pads 112 and 114 preferably are aligned or otherwise associated with the jaws 106 and 108 which may be comprised of rubber or other similar material and which serve to create a gripping connection between the jaws 106 and 108 and the frame 16 and 18 of the stroller 10. Such gripping pads 112 and 114 can also serve to protect the frame of the stroller from being scratched or damaged.

Figure 4:
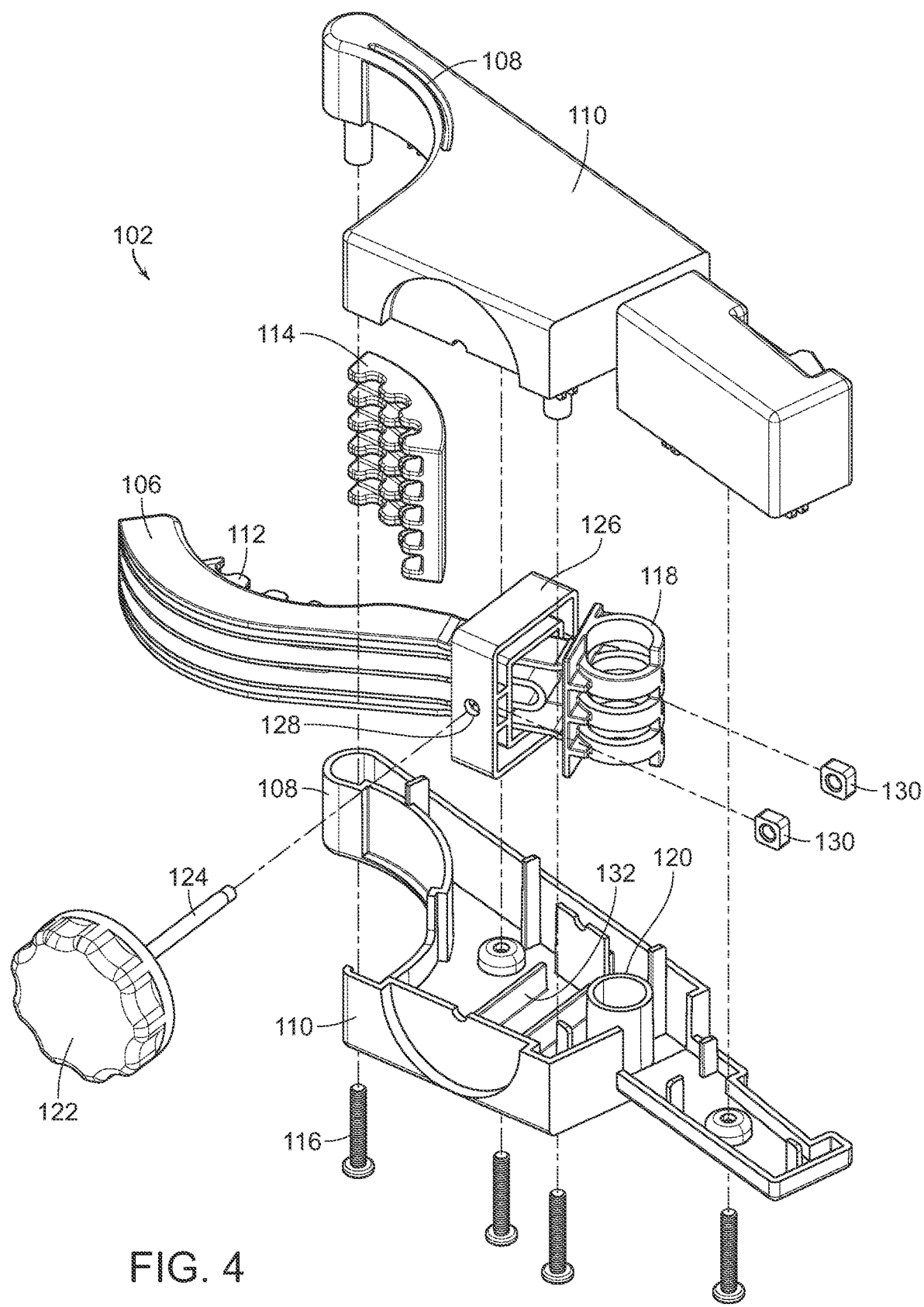
FIG. 4 is an exploded perspective view of component parts of the mounting mechanism.
Figure 5:
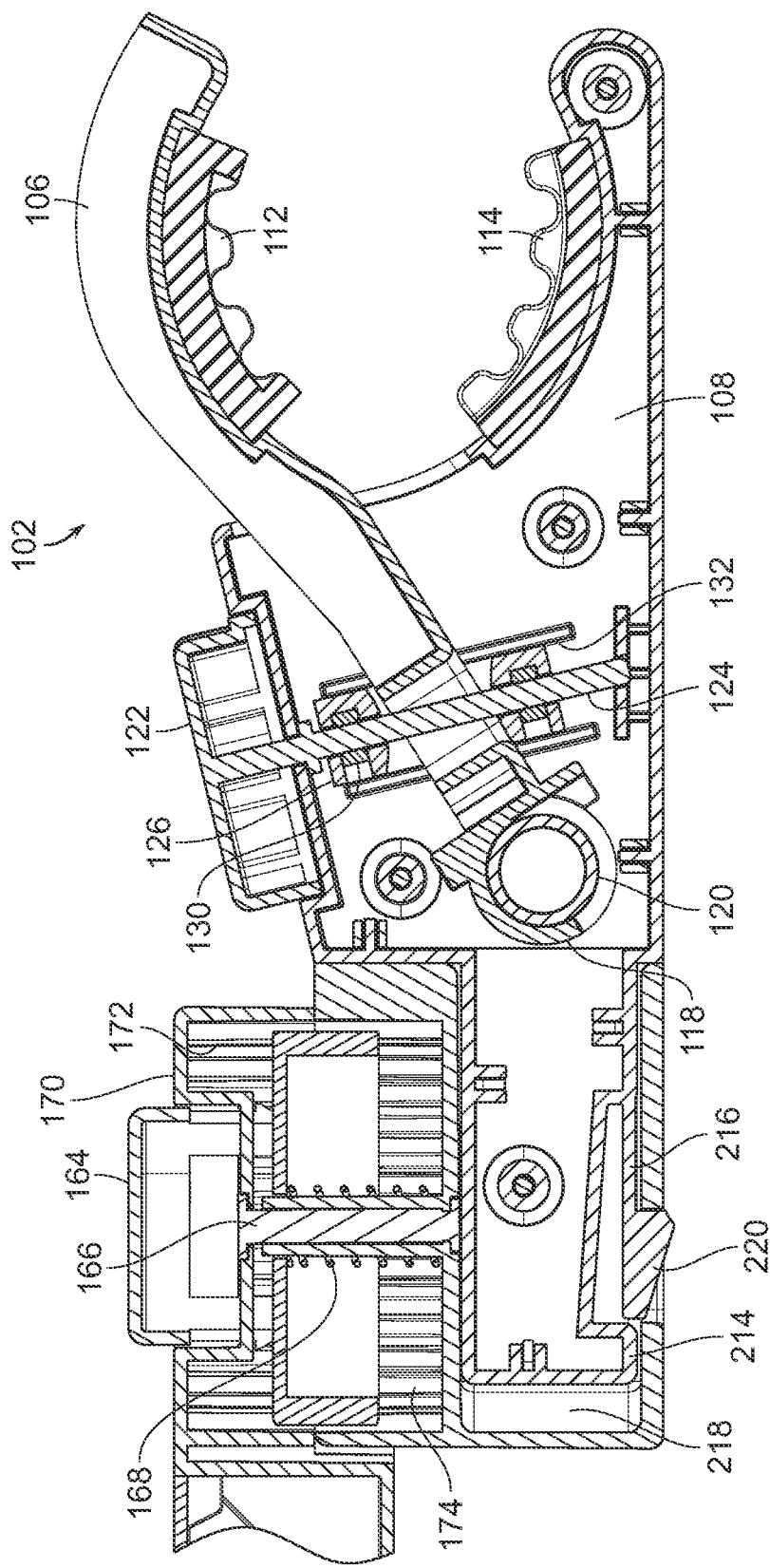
FIG. 5 is a cross-sectional view of a mounting mechanism used in connection with the present invention in an open state.

With reference now to FIGS. 3-5, various views of the mounting mechanism 102 are shown. With particular reference to FIG. 4, which is an exploded perspective view of various components of the mounting mechanism 102, the housing 110, as described above, has an extension which forms the second jaw 108. The housing 110 may be formed of two hollow or clam-shaped members which are interconnected to one another, such as by the illustrated fasteners 116 so as to house various components of the mounting mechanism 102 therein. An end 118 of jaw 106 is pivotally or rotatably coupled to the housing 110, such as a post 120 extending within the housing 110 and over which the circular end 118 is disposed. A manual dial or wheel 122 has a shaft 124 extending therefrom and which serves to selectively move the jaw 106 either towards or away from jaw 108 as the dial 122 is rotated clockwise or counterclockwise. One mechanism for doing so includes a bracket 126 associated with a portion of the jaw 106 and through which the shaft 124 is attached or extends therethrough, such as through aperture 128. Nuts 130 are associated with the bracket 126, such as being interposed between the bracket 126 and the jaw 106 and through which the shaft 124 extends such that as the dial 122 and shaft 124 are rotated, bracket 126, and thus jaw 106, are moved linearly within track 132 of the housing 110, in which the bracket 126 partially resides and slidably moves within such that the jaw 106 is moved and pivots or rotates around post 120 so as to be brought towards and away from fixed jaw 108. Thus, when a portion of the frame of the stroller 100 is disposed between jaws 106 and 108, jaw 106 can be brought into increasingly tightened relationship with the frame member as it is brought towards jaw 108. Thus, the assembly will be attached to the frame of the stroller 10 by the first and second mounting mechanisms 102 so as to extend away from the stroller 10, typically and preferably behind the stroller, as illustrated in FIG. 1. Rotating the dial 122 in the opposite direction will cause adjustable jaw 106 to be moved away from fixed jaw 108 and released from the frame member 16 or 18 of the stroller 10 for detaching the assembly 100 from the stroller 10.

With reference now to FIGS. 3, 7 and 8, first and second arms 134 extend between the mounting mechanisms 102 and a handle 136 of the assembly 100. As illustrated in FIG. 2, the first and second arms are spaced apart and generally parallel to one another. Moreover, when the first and second mounting mechanisms 102 are attached to the frame members 16 and 18 of the stroller 10, the arms 134 and handle 136 extend behind the stroller 10. The handle 136, as illustrated in FIG. 2, extends between the first and second arms 134. As illustrated in FIG. 2, the assembly 100 of the present invention has a generally U-shaped configuration. As shown by the directional arrows in FIG. 2, as well as illustrated in FIGS. 7 and 8, in a particularly preferred embodiment, the length of the arms 134, or the distance between the handle 136 and the mounting mechanisms 102 is selectively adjustable. This enables the assembly 100 of the present invention to be adjustable in length as different strollers of different configurations may require that the handle 136 be disposed farther away from the frame members 16 and 18 of the stroller 10 than with strollers of other configurations where the handle 136 may be able to be brought closer to the stroller 10. Moreover, children of different ages, sizes or arm lengths may be better suited closer to the stroller 10 or farther away from the stroller 10. The length adjustability of the arms 134 of the present invention accommodates these situations.

With reference now to FIGS. 7-11, while there are various mechanisms and methodologies for enabling the adjustment of the length of the arms 134 and/or the distance of the handle 136 to the mounting mechanisms 102, in a particularly preferred embodiment, as illustrated, the assembly 100 incorporates an arm extension and retraction mechanism 138 associated with each of the first and second arms 134 for adjusting the distance of the handle 136 to the first and second mounting mechanisms. 102. A housing 140, which may be comprised of separate housing members 140 attached to one another so as to form a cavity therein into which an end of the arm 134 may extend into or be retracted from is provided. The housing members 140 may be attached by fasteners 144 to hold them together and form the housing 140. Each arm 134 may be attached to a guide 146 which is slidably movable within the cavity 142 of the housing 140. For example, the guide 146 may have a plug 147 associated therewith 147 which is insertable into an end of the arm 134, which comprises a hollow pipe which interconnects the arm 134 to the plug 147, such as by frictional fit, for affixing the arm 134 to the guide 146. The guide 146 is of a configuration so as to be slidably moved within the cavity 142 of the housing 140. Preferably, the cavity 142 is of a configuration or comprises a track along which the guide 146 can slidably travel.

Figure 10:
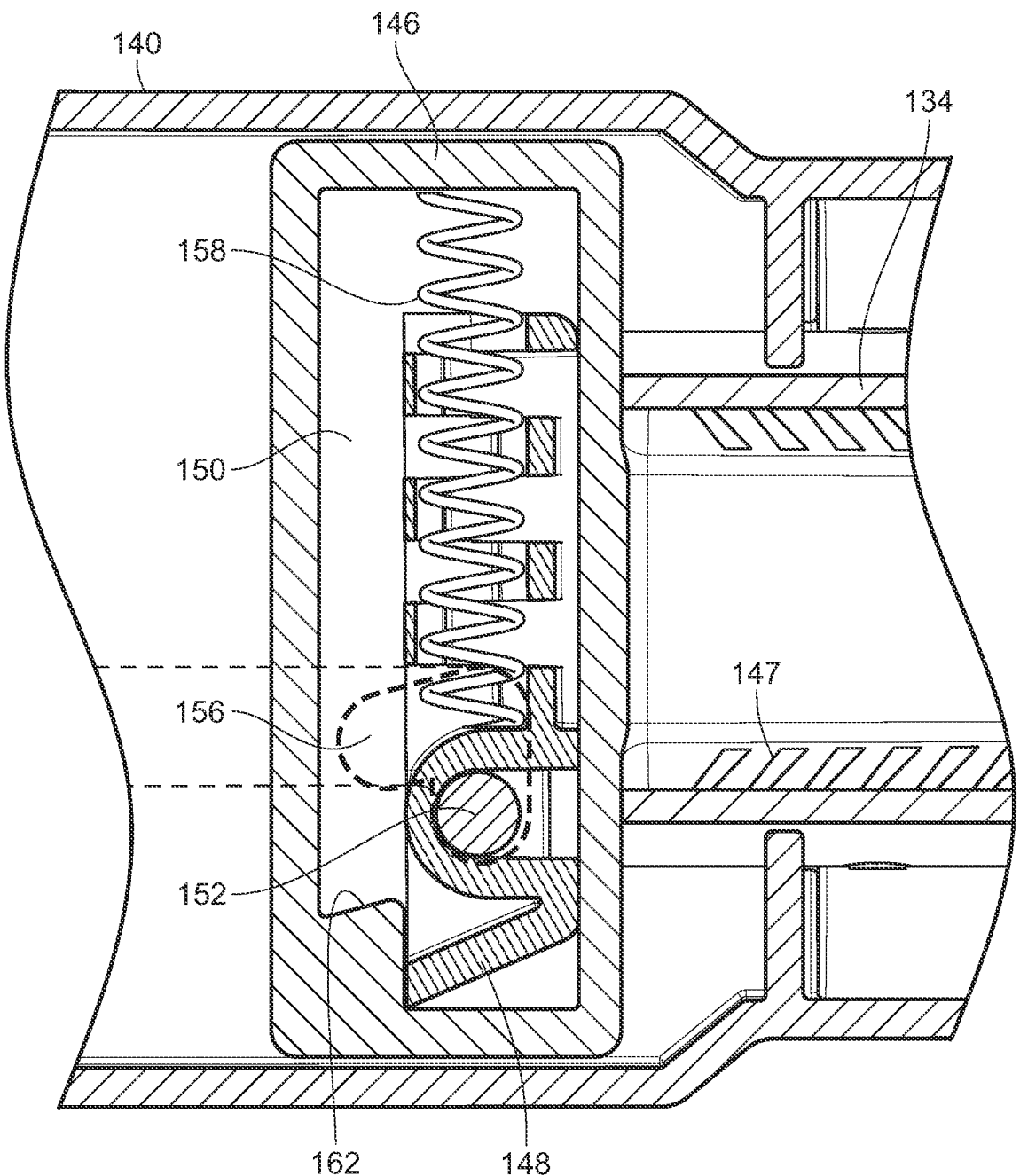
FIG. 10 is a cross-sectional view illustrating components of the arm extension and retraction mechanism in a locked state.
Figure 11:
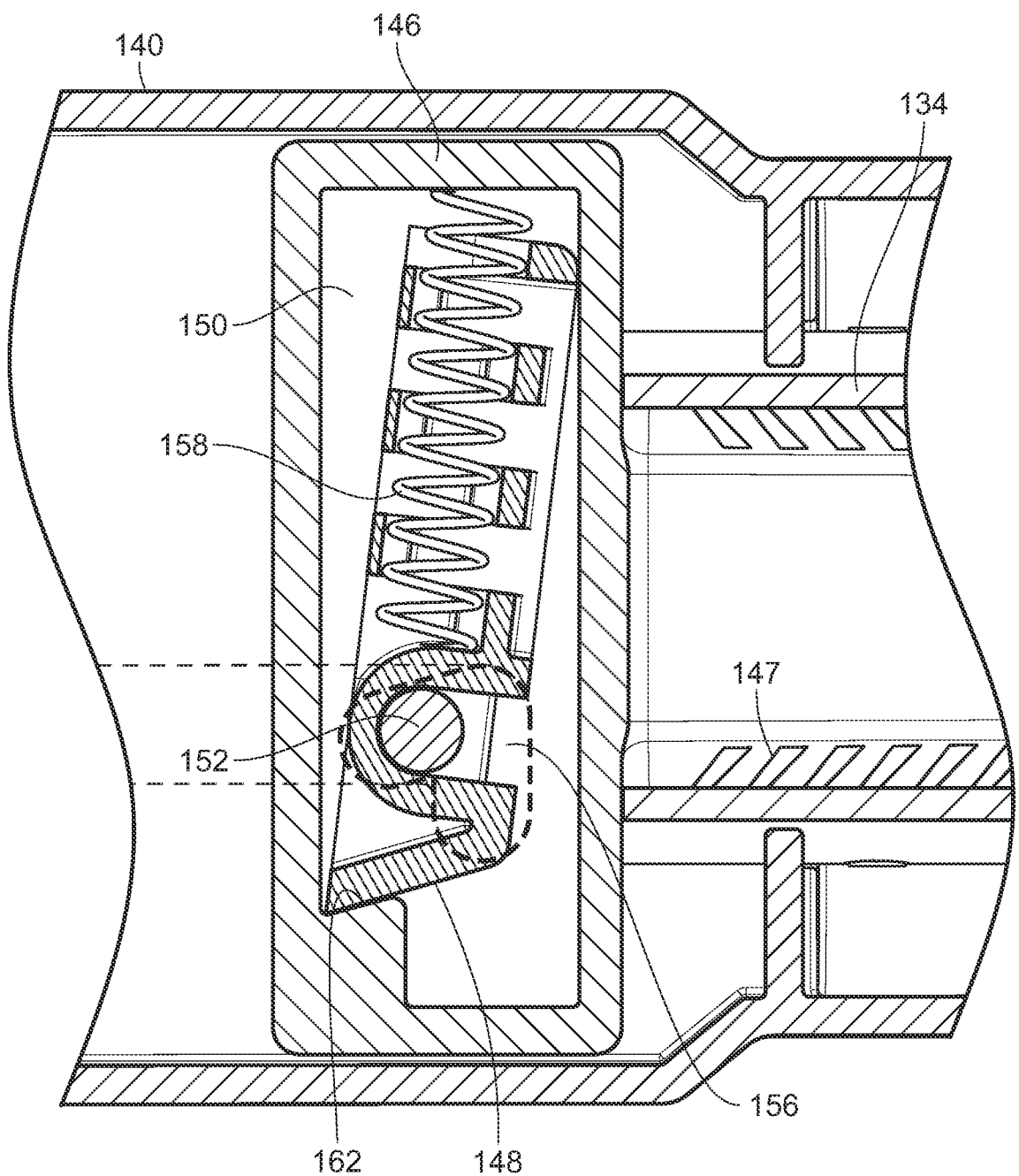
FIG. 11 is a cross-sectional view similar to FIG. 10, illustrating the components when adjusting the arm extension and retraction mechanism.

A cartridge 148 is disposed within the guide 146. The cartridge 148 is smaller than an interior cavity 150 of the guide 146 so as to be capable of having limited movement therein. A pin 152 extends through an elongated aperture 154 of the housing 140 through an L-shaped aperture 156 formed in the guide 146 and into the cartridge 148. An end portion of the pin 152 extends from the track 154 and housing 140 so as to be manually grasped by the operator of the assembly 100. A spring 158, such as the illustrated compression spring, is disposed within the cartridge 148 and extends from the cartridge 148 so as to contact an interior wall of the guide 146, so as to bias the cartridge 148 into a lower or locked position, as illustrated in FIG. 10. This causes the pin 152 to be moved downwardly into a lowermost area of the L-shaped aperture 156. When the pin 152 is disposed within a locking recess 160 portion of track 154, it is held in place by both the geometry of the locking recess area 160, as well as the biasing of spring 158 against cartridge 148, which holds it in place.

However, a user may manually lift the pin 152 from the recess 160 and into track 154, causing the cartridge 148 to be lifted upwardly and spring 158 to be compressed. This enables the pin 152 to be slid along a length of the track 154. Preferably, a ledge 162 is provided within the guide 146 which receives a portion of the cartridge 148 thereon when the pin 152 has been lifted upwardly and into an upper portion of the L-shaped aperture 156 of the guide 146. Thus, the operator is able to easily slidably move the pin 152 along a length of the track 154 until it comes into registration with another recessed locking area, which are spaced along the length of the track 154. At that point, the user may manually slide the pin 152 into such a locking recessed area 160, or the bias of the spring 158 will cause the cartridge 148 to be moved downwardly, and pin 152 into the lower area of the L-shaped aperture 156 so as to return into a locking position, as illustrated in FIG. 10. As this occurs, the arm 134, which is connected to the guide 146 is moved as the pin 152 is manually moved, so as to be retracted into the housing 140 or extended away from the housing 140 so as to retract or extend the effective length of the arms 134, as the distance between the handle 136 and the mounting mechanisms 102.

Figure 15:
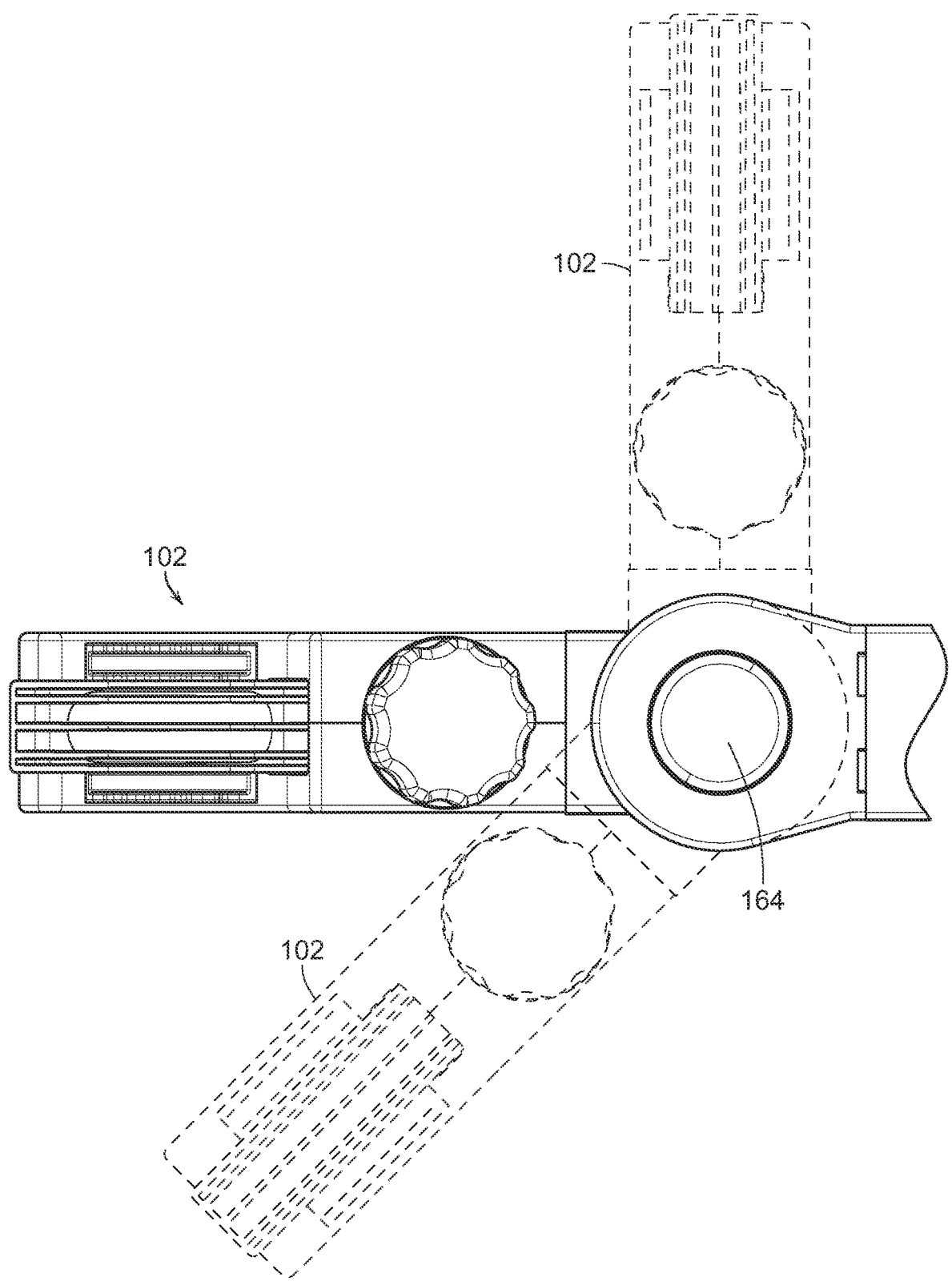
FIG. 15 is a side and diagrammatic view illustrating selective pivoting of the mounting mechanism relative to an arm to raise and lower the handle of the assembly, accordance with the present invention.

As illustrated by the rotational directional arrows in FIG. 2, the handle 136 can be pivoted upwardly or downwardly with respect to the mounting mechanisms 102. Typically, both the handle 136 as well as the arms 134 are pivoted upwardly or downwardly in a selective manner so as to position the handle 136 at a desired height for the child. This may be done by interconnecting the first and second arms pivotally to their respective first and second mounting mechanisms 102. As shown in FIGS. 3 and 15, a push button 164 is provided wherein by pressing against the button 164 unlocks the mounting mechanism 102 from the arm extension and retraction mechanism housing 140 to enable the arm and retraction mechanism 138, and thus arms 134 to be pivoted upwardly or downwardly with respect to the mounting mechanisms 102. Thus, when the mounting mechanisms 102 are attached to the frame members 16 and 18 of the stroller 10, the user merely need depress buttons 164 on either side of the assembly 100 and lift the arms 134 and/or the handle 136 upwardly or downwardly to a desired position. Once the button 164 is released, the arms 134 and handle 136 will be locked into place.

Figure 6:
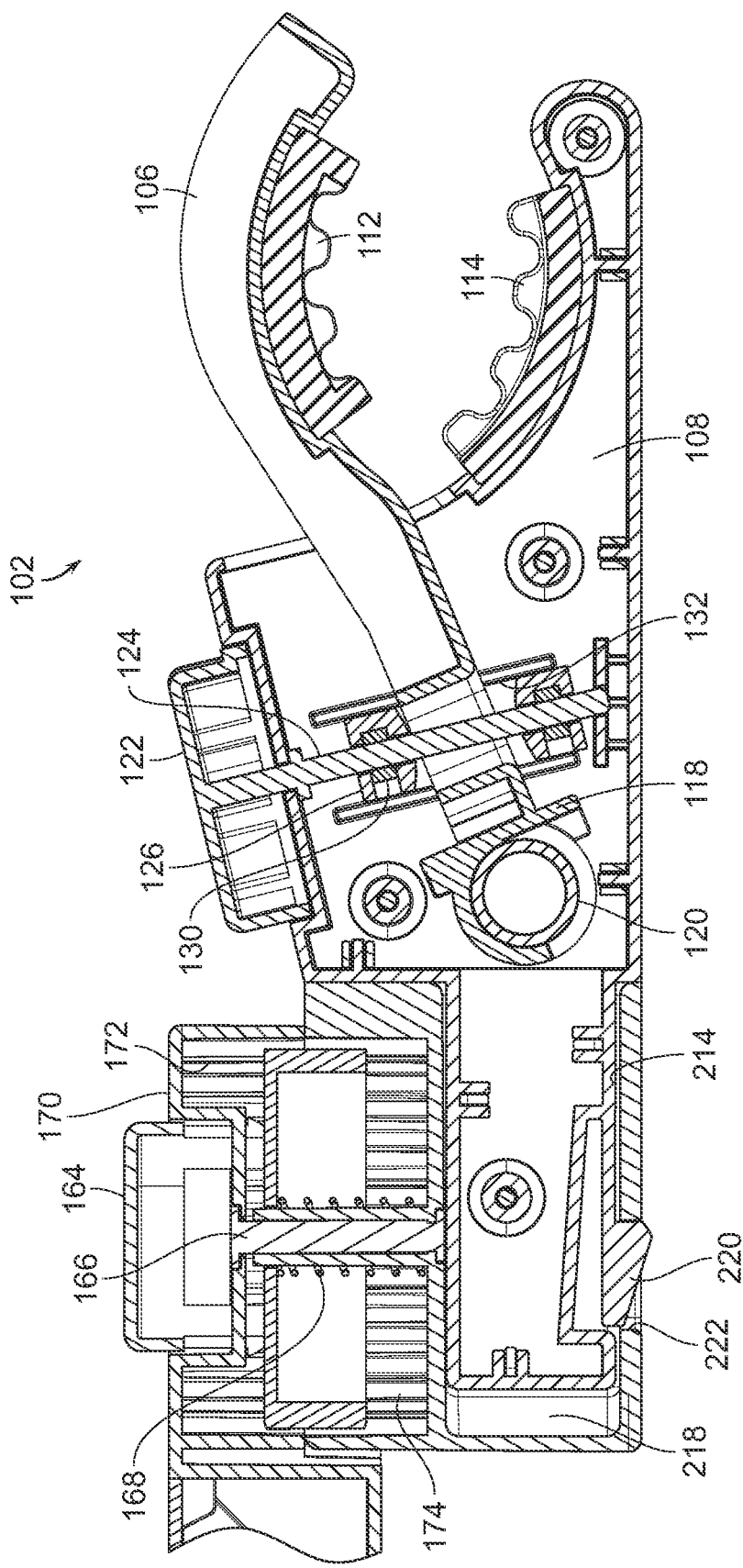
FIG. 6 is a cross-sectional view similar to FIG. 5, but illustrating the mounting mechanism in a closed or tightened state.
Figure 9:
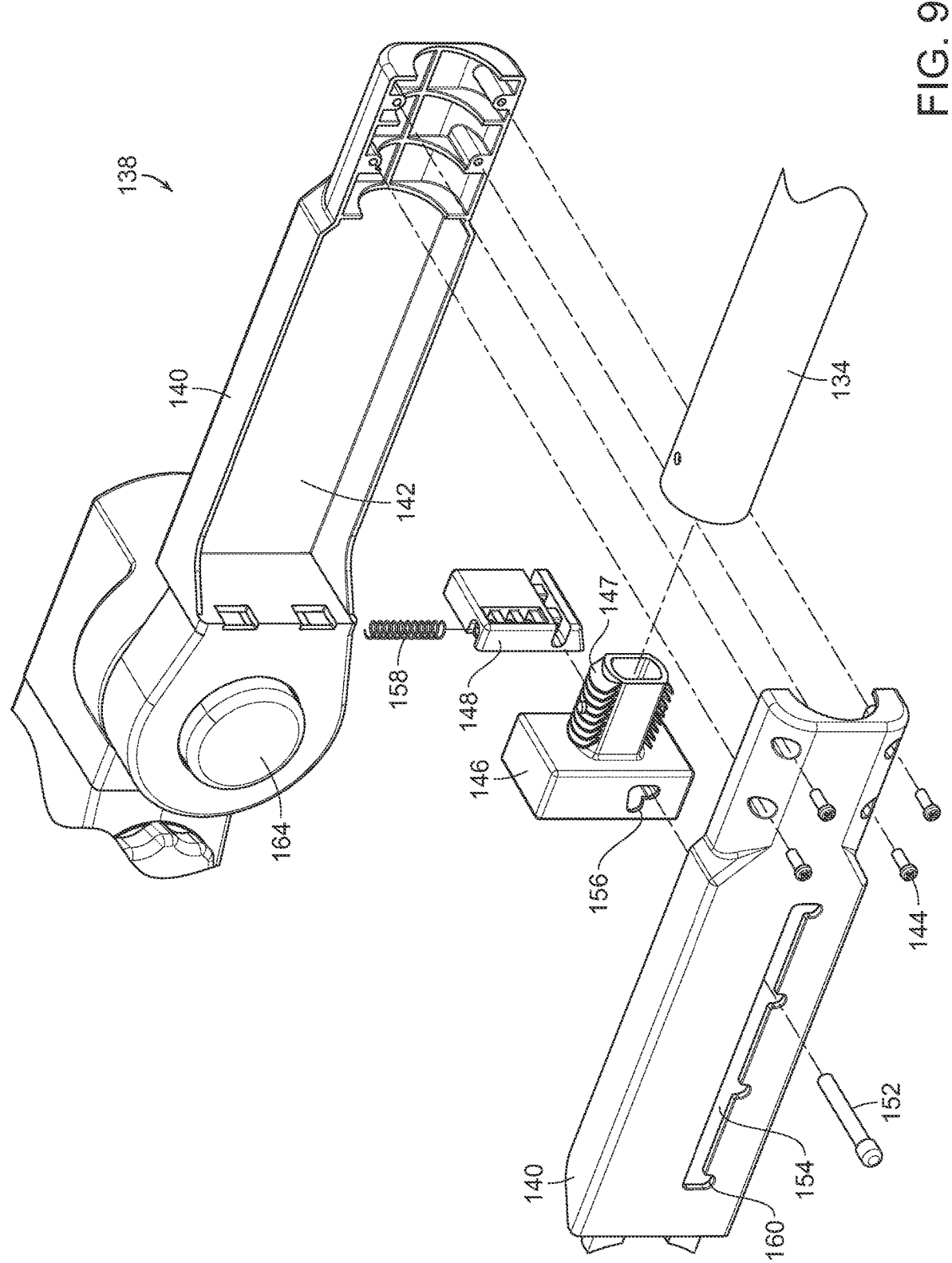
FIG. 9 is an exploded perspective view of component parts of the arm extension and retraction mechanism of the present invention.

With reference now to FIGS. 5 and 6, cross-sectional views are shown of the pivot lock release button 164, which is attached to a stem 166 disposed within compression spring 168, which biases the button 164 outwardly and into a locked position. A housing 170, into which the button 164 may be extended into, has an inner surface 172 lined with locking members, which may be in the form of teeth or the like. Button 164 is operably connected to a locking member 174, which may have corresponding locking teeth 174 formed on an outer surface thereof configured to engage with the locking teeth 172 of the housing 170. When the button is in its biased and outward position, the teeth of lock 174 are engaged with the locking teeth 172 such that the arms 134, and more particularly the housing 140 of the arm extension and retraction mechanism 138 is coupled to in locking relationship to the housing 110 of the mounting mechanism 102. However, when the user manually depresses button 164, the teeth of lock 174 are disengaged from the teeth 172, enabling the arms 134, and thus the handle 136 to be rotated and pivoted upwardly or downwardly, as desired. Once button 164 is biased outwardly, by spring 168, teeth 172 and 174 register with one another again so as to create a locking relationship and prevent such rotation or pivotal movement.

Figure 12:
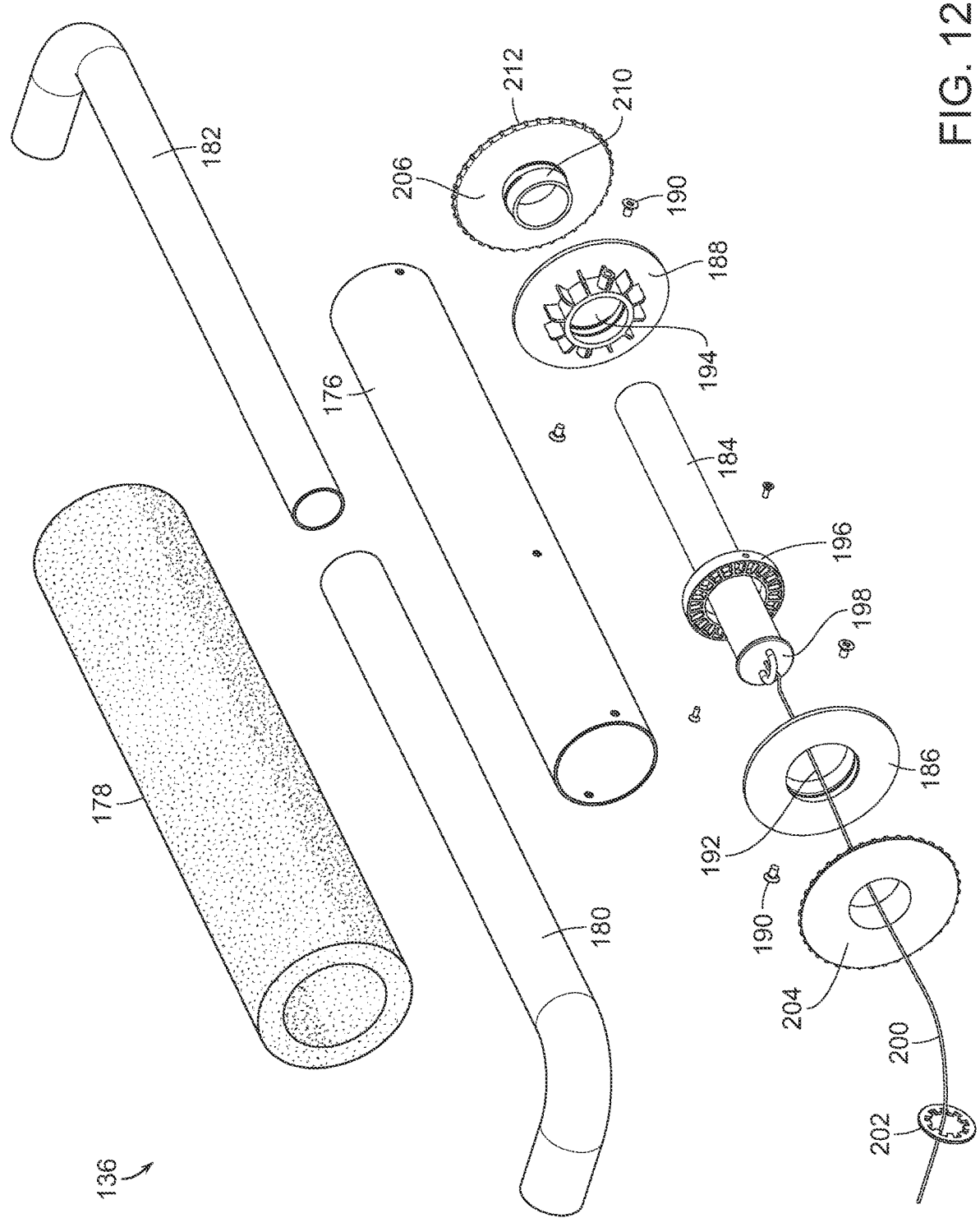
FIG. 12 is an exploded perspective view of components of a handle used in accordance with the present invention.
Figure 13:
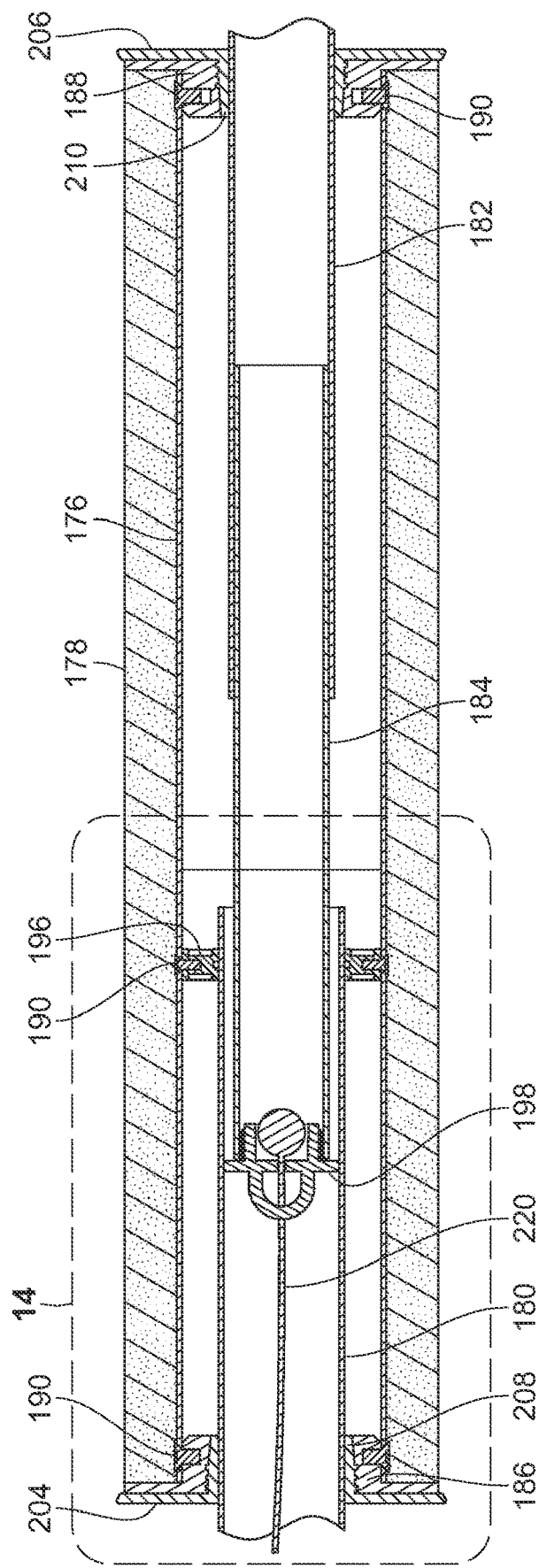
FIG. 13 is a cross-sectional view of the handle and telescopic tubes thereof.
Figure 14:
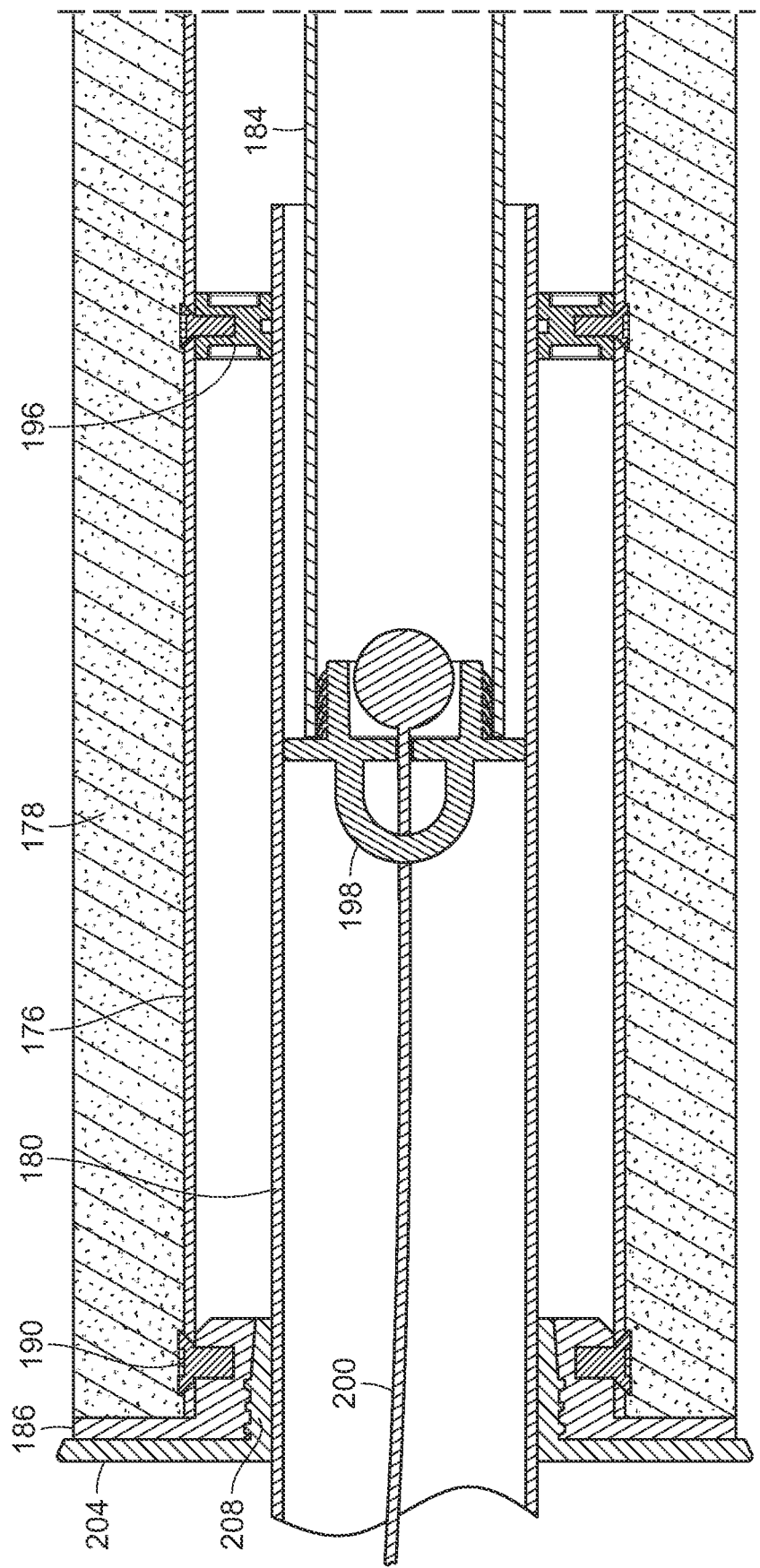
FIG. 14 is an enlarged view of area "14" of FIG. 13.

With reference now to FIGS. 12-14, the handle 136 generally comprises a handlebar which extends between the arms 134 and enables a child to grasp thereto for support and assistance in walking behind the stroller 10. Typically, as illustrated, the handle 136 is an assembly of components which enables the handle 136 to be adjustable and increase or decrease the distance between the first and second arms 134. The handle 136 comprises a main or central handlebar or tube 176. This may be covered with a cushion and/or grip material 178, which may be comprised of foam or the like for comfort and gripping purposes. A plurality of tubes are telescopically arranged to selectively increase and decrease the length of the handle 136.

Tubes 180 and 182 are slidably connected with a slider and spacer tube 184. Tubes 180 and 182 may be connected to the left and right arms 134, or the arms 134 may be formed integrally with tubes 180 and 182, so as to extend towards the mounting mechanisms 102. As illustrated in FIGS. 13 and 14, tubes 180 and 182 are of a greater internal diameter than the outer diameter of the slider/spacer tube 184. Collars 186 and 188 are disposed within the main tube 176, and preferably fastened thereto, such as by means of fasteners 190 extending through aligned apertures of the main tube 176 and the collars 186 and 188. As illustrated in FIG. 12, the collars 186 and 188 have passthrough apertures 192 and 194 through which the ends of tubes 180 and 182, as well as slider/spacer tube 184 may pass through. A guide ring 196 is also disposed within the main tube 176 so as to be disposed between an inner wall of the main tube 176 and an outer wall of tube 180, as illustrated in FIGS. 13 and 14. A plug 198 is inserted into one end of the spacer/slider tube 184, and has a cord 200 extending therefrom to a connection member 202, which connects the cord 200 to one of the tubes 180 or 182. Such attachment prevents or limits the sliding/spacer tube 184 from being moved along an axial direction. The plug 198 also has a configuration which retains it and an end of the slider/spacer tube 184 within the tube 180.

However, as illustrated in FIG. 13, an end of tube 182 is telescopically slidably disposed over slider/spacer tube 184. Slider/spacer tube 184 has a length corresponding to a desired range of widths corresponding to the adjustable widths of the arms 134. For example, if a range of up to six inches in the width between the arms 134 is desired, the slider/spacer tube 184 will have at least a length of six inches. Manual locks 204 and 206 are provided each having a hub 208 and 210 extending therefrom and into the apertures 192 and 194 of the collars 186 and 188. The locks 204 and 206 may include teeth 212 or another gripping outer surface to enable the user to grasp each lock 204 and 206 and rotate it, such that the lock 204 or 206 may be rotated into the collars 186 and 188 or out of the collars 186 and 188 so as to lock or unlock the adjustability of the handle 136. The apertures 192 and 194 of the collars 186 and 188 and/or the hubs 208 and 210 are tapered such that as one or more of the locks 204 and/or 206 are rotated in a locking direction, the hubs 208 and 210 increasingly grip upon an outer surface of the tubes 180 and 182, so as to hold them in place. However, as the locks 204 and 206 are rotated the opposite direction so as to unlock the handle 136, the grip upon the outer surface of tubes 180 and/or 182 is lessened until tubes 180 and/or 182 may be manually moved outwardly or inwardly so as to adjust the width of the handle 136, or the distance between arms 134. The locking mechanism of the collars 186 and 188 and rotatable locks 204 and 206 may then be locked again by rotating one or both of the locks 204 and/or 206 until a gripping and compressive engagement is formed between hubs 208 and 210 and the inner surface of forming the apertures 192 and 194 of the collars 186 and 188, causing the tubes 180 and 182 to be held firmly in place.

Figure 16:
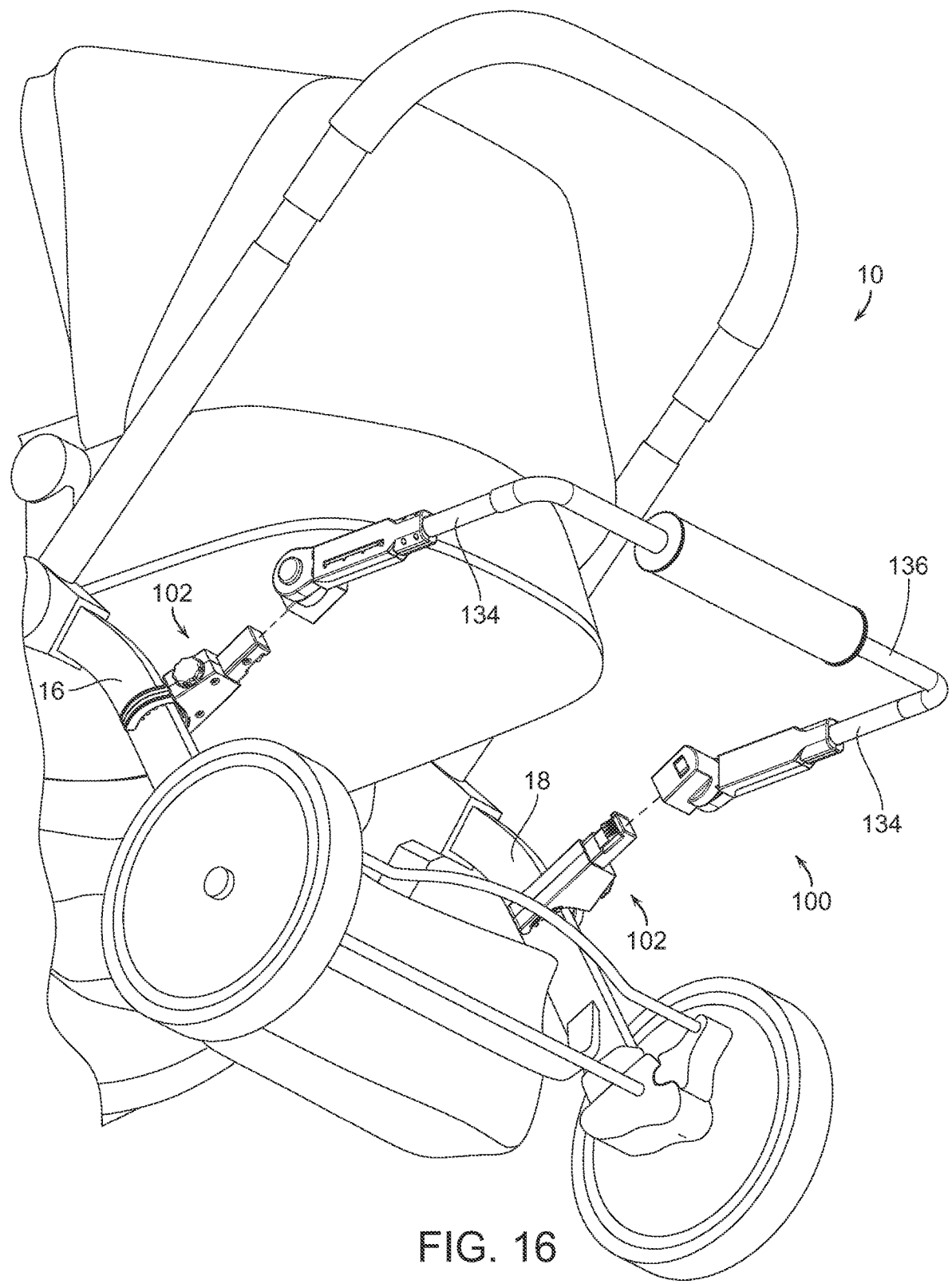
FIG. 16 is an enlarged perspective view of the child walking assembly, similar to FIG. 2, but illustrating mounting mechanisms of the assembly attached to frame members of the stroller and detached from a remainder of the assembly, in accordance with the present invention.

With reference now to FIG. 16, the mounting mechanisms 102 may be detachably connected to the remainder of the assembly 100. This can be useful in that once appropriate connection points of the frame of the stroller are found, and the mounting mechanisms connected thereto, the remainder of the assembly 100 can be detached from the mounting mechanisms 102, such that the mounting mechanisms 102 remain on the frame of the stroller 10 and can be stored with the stroller 10 when not in use. However, when in use, the remainder of the assembly 100 can be easily reattached to the mounting mechanisms 102, and thus the stroller 10.

Figure 17:
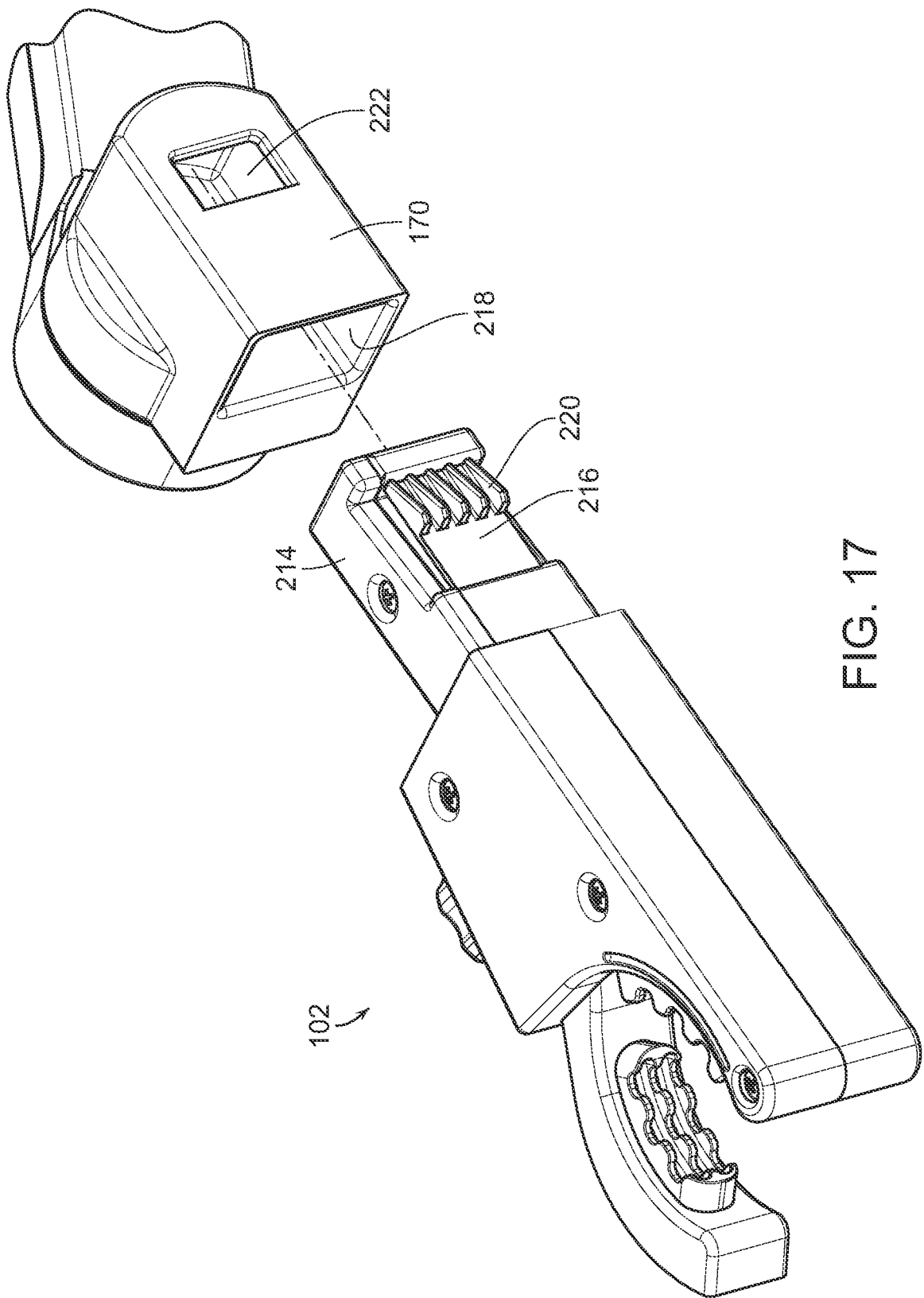
FIG. 17 is an enlarged perspective view of a mounting mechanism detached from an end of the assembly, in accordance with the present invention.

With reference now to FIGS. 5, 6 and 17, an extension 214 of the mounting mechanisms 102 has a manually actuated lock 216, such as in the form of a manually depressible lever arm or wedge having one end attached to the extension 214 and another free end. The extension 214 is insertable into cavity 218 of the housing 170 of the pivoting mechanism until locking members 220 of the locking arm 216 register with and extend outwardly from aperture 222 of the housing 170, so as to lock the mounting mechanism 102 in place. However, merely depressing the lock 216, such as by pushing against the locking members 220 and pulling the remainder of the assembly 100 away from the mounting mechanism 102 causes the extension 214 to slide out of the cavity 218. The mounting mechanism 102, as described above, may be attached to the frame of a stroller 10 so as to be left in place at the desired locations on the frame. The first and second mounting mechanisms 102 remain with the frame of the stroller 10 until intentionally removed. However, the remainder of the assembly 100 may be easily detached when the stroller 10 is going to be put away, such as when being folded and put in a trunk or other compartment of a car or the like and reattached when the assembly 100 and stroller 10 are going to be used again, which can save the user of the assembly 100 installation time.

In use, as illustrated in FIG. 2, the mounting mechanisms 102 are attached to frame members 16 and 18 of the stroller 10, typically at locations of the frame of the stroller 10 which are rearward and/or at opposing sides of the stroller. If necessary, or desired, the length of the handle 136 is adjusted so that the mounting mechanisms 102 may be attached to the desired frame connection points 16 and 18 of the stroller. It will be appreciated that strollers are of varying widths and thus the child walking assembly 100 of the present invention is adjusted in width so as to be used with a variety of different strollers 10.

As mentioned above, the frame members 16 and 18 are disposed between the jaws 106 and 108, which form the clamp of the mounting mechanisms 102. Dial 122 is then rotated until the jaws 106 and 108 are moved into firm contact with the frame 16 and 18 of the stroller 10 so as to securely connect the child walking assembly 100 to the stroller 10, such that the assembly 100 extends rearwardly from the stroller 10.

As illustrated and described above, the mounting mechanisms 102 may be attached to the frame members 16 and 18 of the stroller at desired locations and be left there, detached from the remainder of the assembly 100 for future reattachment when the assembly 100 and stroller 10 are going to be used. In fact, the mounting mechanisms 102 may be detached from the remainder of the assembly 100 and attached to the frame members 16 and 18 of the stroller 10 more easily as they are small and would be unencumbered by the remainder of the assembly 100 when locating and attaching the mounting mechanisms 102. When the assembly 100 is going to be used, the remainder of the assembly 100 could then be attached to the mounting mechanisms 102, and then detached from the mounting mechanisms 102, which will remain attached to the stroller frame.

If necessary, or desired, the arms 134 may be extended or retracted such that the handle 136 is at a desired distance and placement to the back of the stroller 10. This is done by manually moving pin 152 along track 154 until the pin is moved into the desired locking recess 160. When the pin 152 is within a locking recess 160, arms 134 cannot be extended or retracted, and the handle 136 is set at a desired distance from the mounting mechanisms 102 and the stroller 10.

If desired, or necessary, the handle 136 is raised or lowered to be properly positioned relative to the child. This is done by manually pressing buttons 164 of the pivot mechanism, and lifting upwardly either the arms 134 and/or handle 136. When buttons 164 are depressed, there is a rotational range of movement of the arms 134. When the buttons 164 are no longer depressed, then the teeth 172 and 174 will come into locking engagement with one another, preventing further pivoting or rotation and securing the handle 136 at the desired height. This enables the child to grasp the handle 136, typically the padded or grip portion 178 and walk behind the stroller 10 as the parent or caregiver pushes the stroller 10.

The assembly 100, and particularly the handle 136 provides a grip and a support to the child as he or she is walking behind the stroller 10. Positioning the child between the parent and the stroller 10 is desirable as the child is within close reach of the parent or caregiver, if the occasion arises the parent needs to reach to the child. Moreover, positioning the child behind the stroller 10 is advantageous and provides additional safety to the child as when strollers are pushed through crowds or within stores amongst shelving or racks of clothes or the like the child will be positioned behind the stroller 10 and will not come into contact with objects or passersby passing by the sides of the stroller 10.

Although several embodiments have been described in detail for purposes of illustration, various modifications may be made without departing from the scope and spirit of the invention. Accordingly, the invention is not to be limited, except as by the appended claims.

What is claimed is:

1. A child supportive walking assembly for a stroller, comprising:
   a first mounting mechanism detachably connectable to a frame of the stroller intermediate rear wheels and a handle of the stroller;
   a first arm extending from the first mounting mechanism and behind the stroller; a second mounting mechanism detachably connectable to the frame of the stroller intermediate the rear wheels and the handle of the stroller in spaced relation to the first mounting mechanism;
   a second arm extending from the second mounting mechanism and behind the stroller, the first and second arms being in spaced and generally parallel relation to one another; and
   a handle extending between the first and second arms at a height corresponding to a child user, whereby the child user may grasp the handle and walk behind the stroller.

2. The child walking assembly of claim 1, wherein the first and second mounting mechanisms are each adjustably tightened onto the frame of the stroller.

3. The child walking assembly of claim 2, wherein the first and second mounting mechanisms each include an adjustable clamp.

4. The child walking assembly of claim 3, wherein the adjustable clamp comprises an adjustable jaw selectively manually movable into and out of engagement with the frame of the stroller.

5. The child walking assembly of claim 1, wherein the handle is selectively raised and lowered.

6. The child walking assembly of claim 5, wherein the first arm is pivotally attached to the first mounting mechanism and the second arm is pivotally attached to the second mounting mechanism to raise and lower the handle.

7. The child walking assembly of claim 1, wherein the distance between the handle and the mounting mechanisms is adjustable.

8. The child walking assembly of claim 7, including a first arm extension and retraction mechanism associated with the first arm and a second arm extension and retraction mechanism associated with the second arm for adjusting the distance between the handle and the first and second mounting mechanisms.

9. The child walking assembly of claim 1, wherein the handle is adjustable to increase or decrease the distance between the first and second arms.

10. The child walking assembly of claim 9, wherein the handle comprises first and second tubes telescopically arranged to selectively increase or decrease the length of the handle.

11. The child walking assembly of claim 9, including a locking mechanism for selectively locking a length of the handle.

12. The child walking assembly of claim 1, wherein the child walking assembly has a generally U-shaped configuration.

13. The child walking assembly of claim 1, wherein the first and second mounting mechanisms are detachably connected to a remainder of the assembly.

14. A method for enabling a child to supportively walk behind a stroller, comprising the steps of:
providing a child walking assembly comprising first and second mounting mechanisms, first and second arms extending from the first and second mechanisms and a handle extending between the first and second arms;
attaching the child walking assembly to a frame of the stroller by connecting the first and second mounting mechanisms to the frame of the stroller intermediate rear wheels and a handle of the stroller, whereby the handle is disposed a distance behind the stroller and at a height corresponding to a child user; and
the child user grasping the handle and walking behind the stroller.

15. The method of claim 14, including the step of adjusting the distance between the handle and the mounting mechanisms.

16. The method of claim 14, including the step of adjusting a height of the handle by raising or lowering the handle relative to the mounting mechanisms.

17. The method of claim 14, including the step of adjusting a distance between the first and second arms.

18. The method of claim 14, wherein the first and second mounting mechanisms each include a clamp adjustably tightened onto the frame of the stroller; wherein the distance between the handle and the mounting mechanisms is adjustable; wherein the handle is selectively raised and lowered; and wherein the handle is adjustable to increase or decrease the distance between the first and second arms.

19. The method of claim 18, wherein the adjustable clamp comprises an adjustable jaw selectively manually movable into and out of engagement with the frame of the stroller.

20. The method of claim 18, wherein the first arm is pivotally attached to the first mounting mechanism and the second arm is pivotally attached to the second mounting mechanism to raise and lower the handle.

21. The method of claim 18, including providing a first arm extension and retraction mechanism associated with the first arm and providing a second arm extension and retraction mechanism associated with the second arm for adjusting the distance between the handle and the first and second mounting mechanisms.

22. The method of claim 18, wherein the handle comprises first and second tubes telescopically arranged to selectively increase or decrease the length of the handle.

23. The method of claim 18, including providing a locking mechanism for selectively locking a length of the handle.

24. The method of claim 18, wherein the child walking assembly has a generally U-shaped configuration.

25. The method of claim 18, wherein the first and second mounting mechanisms are detachably connected to a remainder of the assembly.

* * * * *